United States Patent
Tabuchi et al.

(10) Patent No.: US 11,941,505 B2
(45) Date of Patent: Mar. 26, 2024

(54) INFORMATION PROCESSING APPARATUS OF CONTROLLING TRAINING OF NEURAL NETWORK, NON-TRANSITORY COMPUTER-READABLE STORAGE MEDIUM FOR STORING INFORMATION PROCESSING PROGRAM OF CONTROLLING TRAINING OF NEURAL NETWORK, AND INFORMATION PROCESSING METHOD OF CONTROLLING TRAINING OF NEURAL NETWORK

(71) Applicant: FUJITSU LIMITED, Kawasaki (JP)

(72) Inventors: Akihiro Tabuchi, Kawasaki (JP);
Akihiko Kasagi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 524 days.

(21) Appl. No.: 16/861,273

(22) Filed: Apr. 29, 2020

(65) Prior Publication Data
US 2020/0372321 A1    Nov. 26, 2020

(30) Foreign Application Priority Data
May 21, 2019 (JP) .................... 2019-095468

(51) Int. Cl.
G06N 3/04 (2023.01)
G06F 16/00 (2019.01)
G06N 3/08 (2023.01)

(52) U.S. Cl.
CPC ............. *G06N 3/04* (2013.01); *G06F 16/00* (2019.01); *G06N 3/08* (2013.01)

(58) Field of Classification Search
CPC ............. G06N 3/04; G06N 3/08; G06F 16/00
See application file for complete search history.

(56) References Cited

U.S. PATENT DOCUMENTS

| 2011/0055131 A1* | 3/2011 | Chen ....................... G06N 3/08 706/25 |
| 2013/0279796 A1* | 10/2013 | Kaizerman .......... G06V 10/774 382/149 |
| 2015/0379422 A1* | 12/2015 | Chandler ............... G06N 20/00 706/12 |

(Continued)

FOREIGN PATENT DOCUMENTS

| JP | 2017-16414 A | 1/2017 |
| JP | 2017-97585 A | 6/2017 |

(Continued)

OTHER PUBLICATIONS

Yang, Chenglin et al., "Knowledge Distillation in Generations: More Tolerant Teachers Educate Better Students", arxiv.org, Cornell University Library, 201 Olin Library, Cornell University Ithaca, NY 14853, pp. 1-12, May 15, 2018.

(Continued)

*Primary Examiner* — Beau D Spratt
*Assistant Examiner* — Reji Kartholy
(74) *Attorney, Agent, or Firm* — Fujitsu Intellectual Property Center (57) ABSTRACT

An information processing method implemented by a computer includes: executing a generation processing that includes generating a first mini-batch by performing data extension processing on learning data and processing to generate a second mini-batch without performing the data extension processing on the learning data; and executing a learning processing by using a neural network, the learning processing being configured to perform first learning by using the first mini-batch, and then perform second learning by using the second mini-batch.

7 Claims, 11 Drawing Sheets

(56) References Cited

U.S. PATENT DOCUMENTS

| | | | |
|---|---|---|---|
| 2017/0004399 A1 | 1/2017 | Kasahara | |
| 2017/0109626 A1 | 4/2017 | Gokmen et al. | |
| 2017/0147921 A1 | 5/2017 | Kasahara | |
| 2017/0206457 A1* | 7/2017 | Roychowdhury | G06Q 30/02 |
| 2018/0012124 A1* | 1/2018 | Hara | G06N 3/0454 |
| 2019/0080195 A1* | 3/2019 | Liu | G06F 18/28 |
| 2020/0065992 A1* | 2/2020 | Sung | G06N 3/084 |
| 2020/0218982 A1* | 7/2020 | Annau | G06N 20/00 |
| 2021/0174066 A1* | 6/2021 | Li | G06V 10/7747 |
| 2021/0256353 A1* | 8/2021 | Nilsson | G06N 3/047 |
| 2022/0036548 A1* | 2/2022 | Hu | G06V 10/95 |

FOREIGN PATENT DOCUMENTS

| | | |
|---|---|---|
| JP | 2019-502970 A | 1/2019 |
| JP | 2019-53383 A | 4/2019 |
| WO | 2019/079198 A1 | 4/2019 |

OTHER PUBLICATIONS

Extended European Search Report dated Oct. 23, 2020 for corresponding European Patent Application No. 20170677.7, 8 pages.

Kayama, Masahiro, "Methodology for Constructing Optimal Multi-layered Neural Networks", Computer Science Department Technical Report[online], University of California, Retrieved from the Internet: <URL: https://ftp.cs.ucla.edu/tech-report/1991-reports/910068.pdf>, pp. 1-22, Sep. 1991 [retrieved on Dec. 27, 2022].

Japanese Office Action dated Jan. 10, 2023 for corresponding Japanese Patent Application No. 2019-095468, with English Translation, 9 pages.

Summers, Cecelia et al., "Improved Mixed-Example Data Augmentation", 2019 IEEE Winter Conference on Applications of Computer Vision (WACV), IEEE, XP033525775, pp. 1262-1270, Jan. 7, 2019 [retrieved on Mar. 4, 2019].

European Office Action dated May 15, 2023 for corresponding European Patent Application No. 20170677.7, 9 pages.

Summers, Cecelia et al., "Improved Mixed-Example Data Augmentation", 2019 IEEE Winter Conference on Applications of Computer Vision (WACV), IEEE, XP033525775, pp. 1262-1270, Jan. 7, 2019 [retrieved on Mar. 4, 2019].

Chinese Office Action dated Dec. 29, 2023 for corresponding Chinese Patent Application No. 202010396902.7, with English Translation, 15 pages. Please note NPL Yang, Chenglin et al., "Knowledge Distillation in Generations More Tolerant Teachers Educate Better Students" cited herewith, was previously cited in an IDS filed on Nov. 5, 2020 .***.

* cited by examiner

INFORMATION PROCESSING APPARATUS OF CONTROLLING TRAINING OF NEURAL NETWORK, NON-TRANSITORY COMPUTER-READABLE STORAGE MEDIUM FOR STORING INFORMATION PROCESSING PROGRAM OF CONTROLLING TRAINING OF NEURAL NETWORK, AND INFORMATION PROCESSING METHOD OF CONTROLLING TRAINING OF NEURAL NETWORK

CROSS-REFERENCE TO RELATED APPLICATION

This application is based upon and claims the benefit of priority of the prior Japanese Patent Application No. 2019-95468, filed on May 21, 2019, the entire contents of which are incorporated herein by reference.

FIELD

The embodiments discussed herein are related to an information processing apparatus, a non-transitory computer-readable storage medium for storing an information processing program, and an information processing method.

BACKGROUND

In learning processing using deep neural networks (DNNs), mini-batches are generated in many cases by randomly transforming learning data to calculate proper weight parameters having high generalization performance, which process is called data extension processing.

Examples of the related art include Japanese Laid-open Patent Publication Nos. 2017-97585 and 2017-16414.

SUMMARY

According to an aspect of the embodiments, an information processing method implemented by a computer includes: executing a generation processing that includes generating a first mini-batch by performing data extension processing on learning data and processing to generate a second mini-batch without performing the data extension processing on the learning data; and executing a learning processing by using a neural network, the learning processing being configured to perform first learning by using the first mini-batch, and then perform second learning by using the second mini-batch.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

However, in the case of using mini-batches generated by the data extension processing, the bias of inference parameters calculated in batch normalization units in learning processing is stronger than in the case of using mini-batches generated without data extension processing. As a result, there are cases where the performance (inference accuracy) of the learning result (the trained model) is low.

In one aspect, an object is to improve the performance of learning result.

The disclosure improves the performance of learning result.

Hereinafter, embodiments are described with reference to the accompanying drawings. In the present specification and the drawings, components having substantially the same functional configurations are assigned with the same reference signs, and duplicated description is omitted.

First Embodiment

<Functional Configuration of Information Processing Apparatus>

Figure 1:
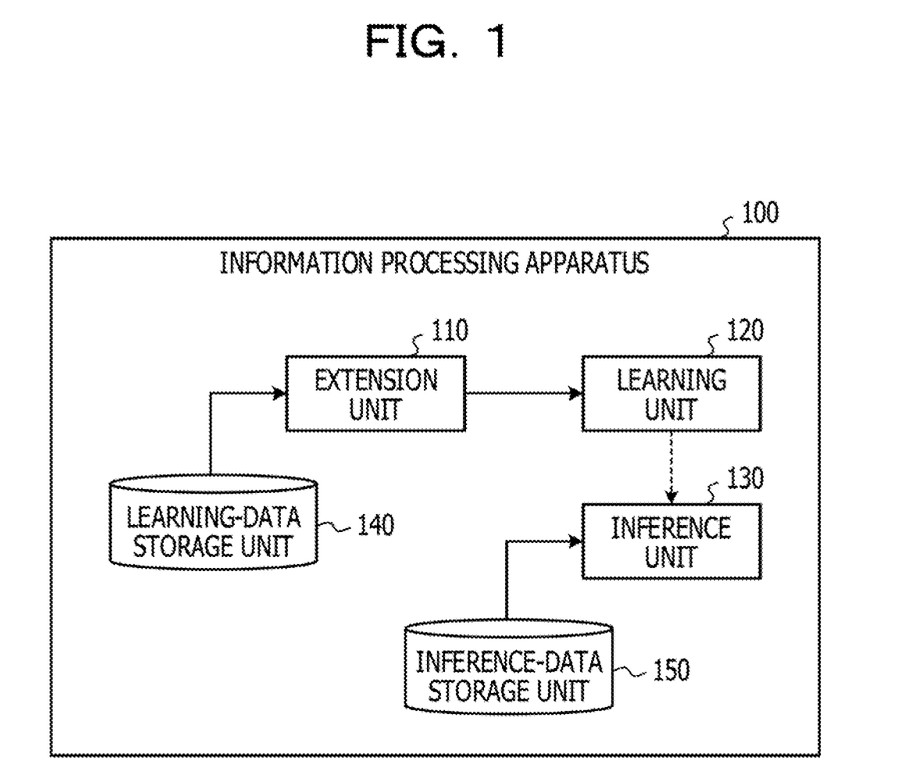
FIG. 1 is a first diagram illustrating an example of the functional configuration of an information processing apparatus.

First, description is made of the functional configuration of an information processing apparatus that performs learning processing using deep neural networks (DNNs) which are an example of neural networks. FIG. 1 is a first diagram illustrating an example of the functional configuration of an information processing apparatus. The information processing apparatus 100 has an information processing program installed, and when the program is executed, the information processing apparatus 100 functions as an extension unit 110, a learning unit 120, and an inference unit 130.

The extension unit 110 is an example of a generation unit. The extension unit 110 reads learning data stored in a learning-data storage unit 140 and executes first data processing in which data extension processing is performed on the read learning data to generate a mini-batches (first mini-batches).

The extension unit 110 also reads the learning data stored in the learning-data storage unit 140 and executes second data processing in which mini-batches (second mini-batches) are generated without performing data extension processing on the read learning data.

For example, the extension unit 110 executes the first data processing that generates the first mini-batches performing the data extension processing on the learning data and the second data processing that generates the second mini-batches without performing the data extension processing on the learning data.

The learning unit 120 performs learning processing, using DNNs. For example, the learning unit 120 first learns using the first mini-batches, and when learning in a specified number of epochs is completed, the learning unit 120 learns using the second mini-batches.

Thus, by first performing learning using the first mini-batches, the learning unit 120 is able to calculate appropriate weight parameters having high generalization performance.

In addition, by performing learning using the second mini-batches after the learning in the epochs of the specified number is completed, the learning unit 120 is able to calculate proper inference parameters having less bias in a batch normalization unit. This is because the inference parameters calculated in the batch normalization unit are highly dependent on the most recent mini-batches (in this case, the second mini-batches having less bias).

For example, the learning unit 120 is able to calculate proper weight parameters having high generalization performance and proper inference parameters having less bias. As a result, the first embodiment is able to improve the performance (inference accuracy) of learning result (the trained model) as compared to the case where learning is performed using only the first mini-batches in the learning processing.

The inference unit 130 reads inference data stored in an inference-data storage unit 150, inputs the inference data into the learning result (trained model) that is obtained as a result of the learning processing performed by the learning unit 120, and outputs inference result.

<Hardware Configuration of Information Processing Apparatus>

Figure 2:
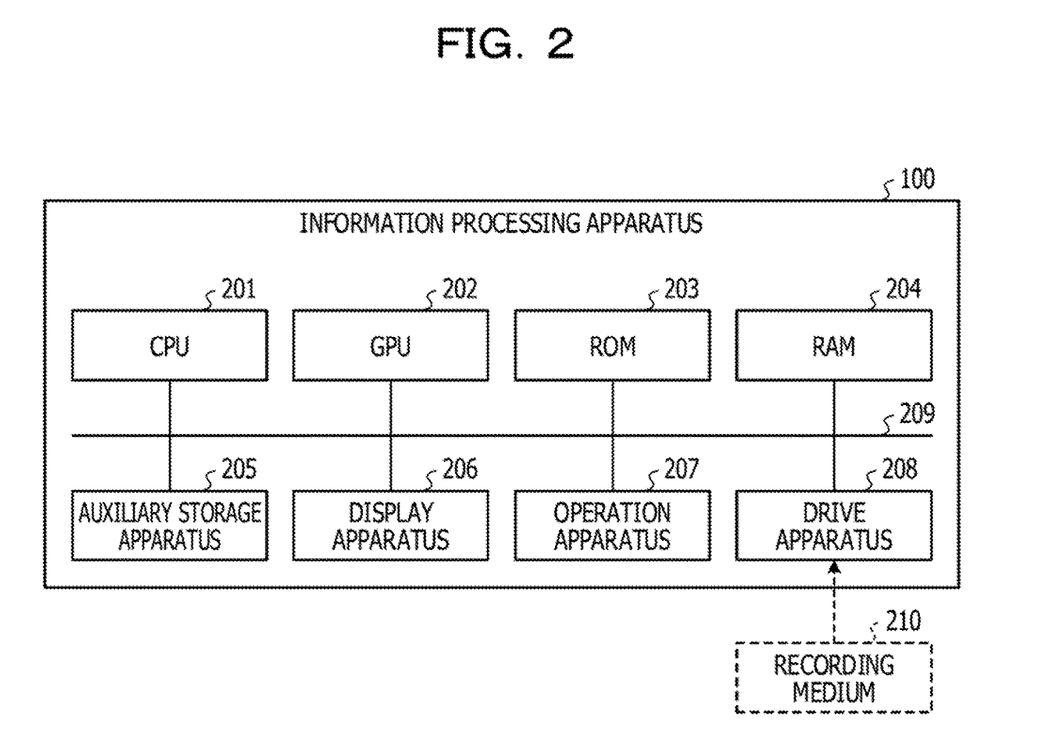
FIG. 2 illustrates an example of the hardware configuration of the information processing apparatus.

Next, the hardware configuration of the information processing apparatus 100 is described. FIG. 2 illustrates an example of the hardware configuration of the information processing apparatus. As illustrated in FIG. 2, the information processing apparatus 100 includes a central processing unit (CPU) 201 and a graphics processing unit (GPU) 202. The information processing apparatus 100 also includes read-only memory (ROM) 203 and random-access memory (RAM) 204. The CPU 201, GPU 202, ROM 203, and RAM 204 form a so-called computer.

The information processing apparatus 100 also includes an auxiliary storage apparatus 205, display apparatus 206, operation apparatus 207, and drive apparatus 208. The hardware components in the information processing apparatus 100 is coupled to each other via a bus 209.

The CPU 201 is a computing device for executing various programs (for example, Information processing programs and others) Installed in the auxiliary storage apparatus 205.

The GPU 202 is a computing device for image processing, and when the CPU 201 executes various programs, the GPU 202 executes high-speed computation by parallel processing on learning data or inference data that is image data. Although the example of FIG. 2 illustrates a case where the information processing apparatus 100 has a single GPU for convenience of explanation, the number of GPUs included in the information processing apparatus 100 is not limited to one.

The ROM 203 is nonvolatile memory. The ROM 203 functions as a main storage device that stores various programs, data, and the like to be used for the CPU 201 executing various programs installed in the auxiliary storage apparatus 205. For example, the ROM 203 functions as a main storage device that stores boot programs such as a basic input/output system (BIOS) and an extensible firmware interface (EFI).

The RAM 204 is volatile memory such as dynamic random-access memory (DRAM) or static random-access memory (SRAM). The RAM 204 functions as a main storage device that provides a work area into which various programs installed in the auxiliary storage apparatus 205 are loaded when the various programs are executed by the CPU 201.

The auxiliary storage apparatus 205 is an auxiliary storage device that stores various programs and data to be used when the various programs are executed. For example, the learning-data storage unit 140 and the inference-data storage unit 150 are implemented in the auxiliary storage apparatus 205.

The display apparatus 206 is a display device that displays the internal state or the like of the information processing apparatus 100. The operation apparatus 207 is an input device used when a user of the information processing apparatus 100 inputs various instructions to the information processing apparatus 100.

The drive apparatus 208 is a device in which a recording medium 210 is set. Examples of the recording medium 210 discussed herein include media that record information optically, electrically, and magnetically such as a CD-ROM, a flexible disk, and a magnetooptical disk. Examples of the recording medium 210 may also include semiconductor memory or the like that records information electrically, such as ROM and flash memory.

Various programs installed in the auxiliary storage apparatus 205 are installed, for example, by setting a distributed recording medium 210 into the drive apparatus 208 and the drive apparatus 208 reading the various programs recorded in the recording medium 210. Alternatively, the various programs installed in the auxiliary storage apparatus 205 may be installed by being downloaded from a not-illustrated network.

<Functional Configuration of Extension Unit of Information Processing Apparatus>

Figure 3:
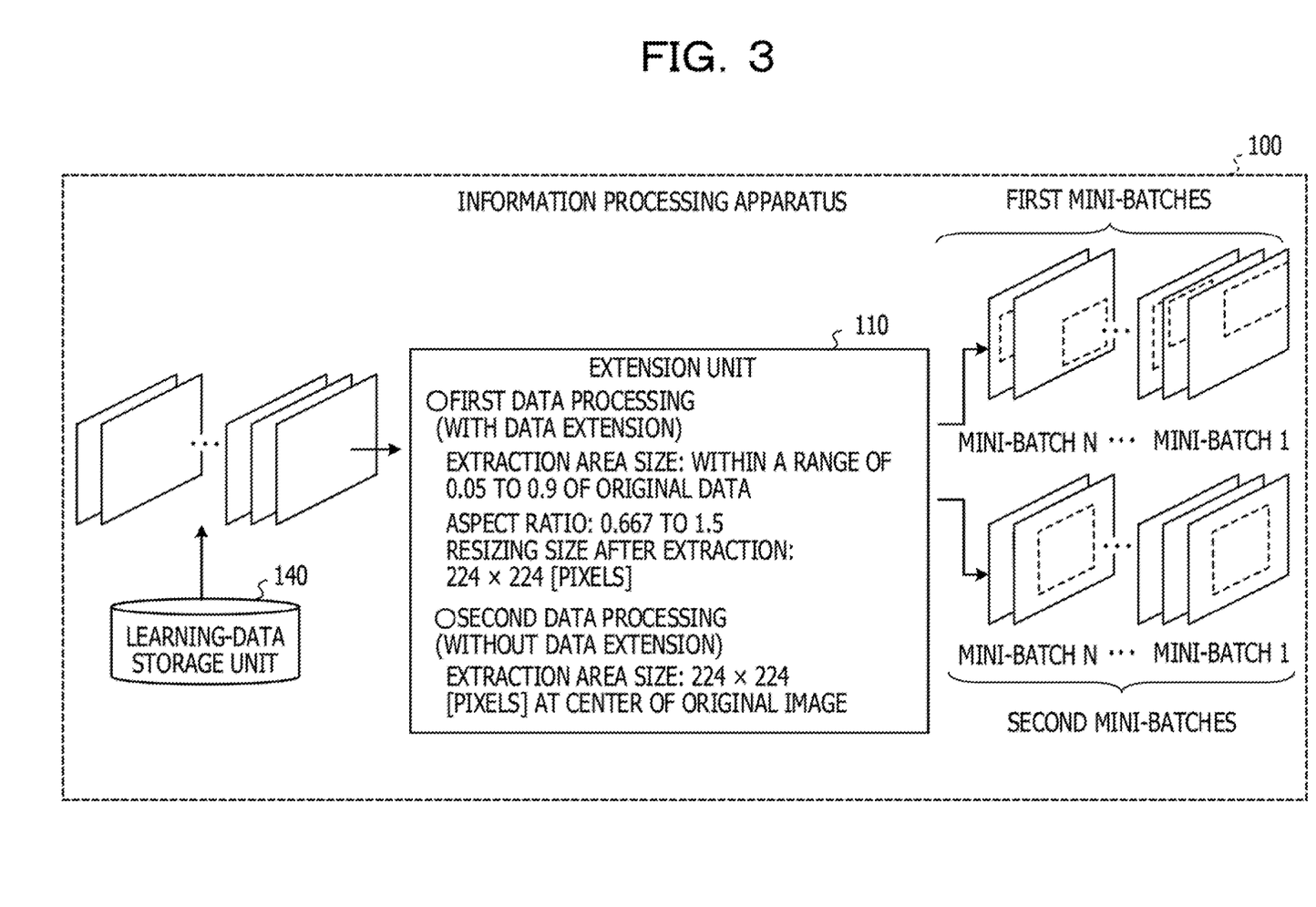
FIG. 3 illustrates an example of the functional configuration of an extension unit of the information processing apparatus.

Next, the functional configuration of the extension unit 110 of the information processing apparatus 100 is described. FIG. 3 illustrates an example of the functional configuration of the extension unit of the information processing apparatus.

As illustrated in FIG. 3, the extension unit 110 reads the learning data from the learning-data storage unit 140 and performs the first data processing and the second data processing. Although the example of FIG. 3 illustrates a case where each piece of the learning data read from the learning-data storage unit 140 has the same size, it is assumed in actual situations that the learning data includes data pieces of various sizes.

As the first data processing, the extension unit 110 extracts, from each piece of the read learning data, an area having a size within a range of 5% to 90% of the data piece and an aspect ratio within a range of 0.667 to 1.5; resizes the extracted area to have the size of 224×224 [pixels]; and outputs first mini-batches including multiple mini-batches each including a specified number of resized areas (the example of FIG. 3 illustrates the outputted first mini-batches including N mini-batches).

As the second data processing, the extension unit 110 resizes each pieces of the read learning data such that the short side is 256 [pixels]; extracts a center area having 224×224 [pixels] from each piece of the resized learning data; and outputs second mini-batches including multiple mini-batches each including a specified number of extracted areas (the example of FIG. 3 illustrates outputted second mini-batches including N mini-batches).

<Configuration Example of Mini-Batches in Learning Processing>

Next, description is made of a configuration example of the first mini-batches in learning processing generated by the extension unit 110 in the first data processing and a configuration example of the second mini-batches in learning processing generated in the second data processing.

Figure 4:
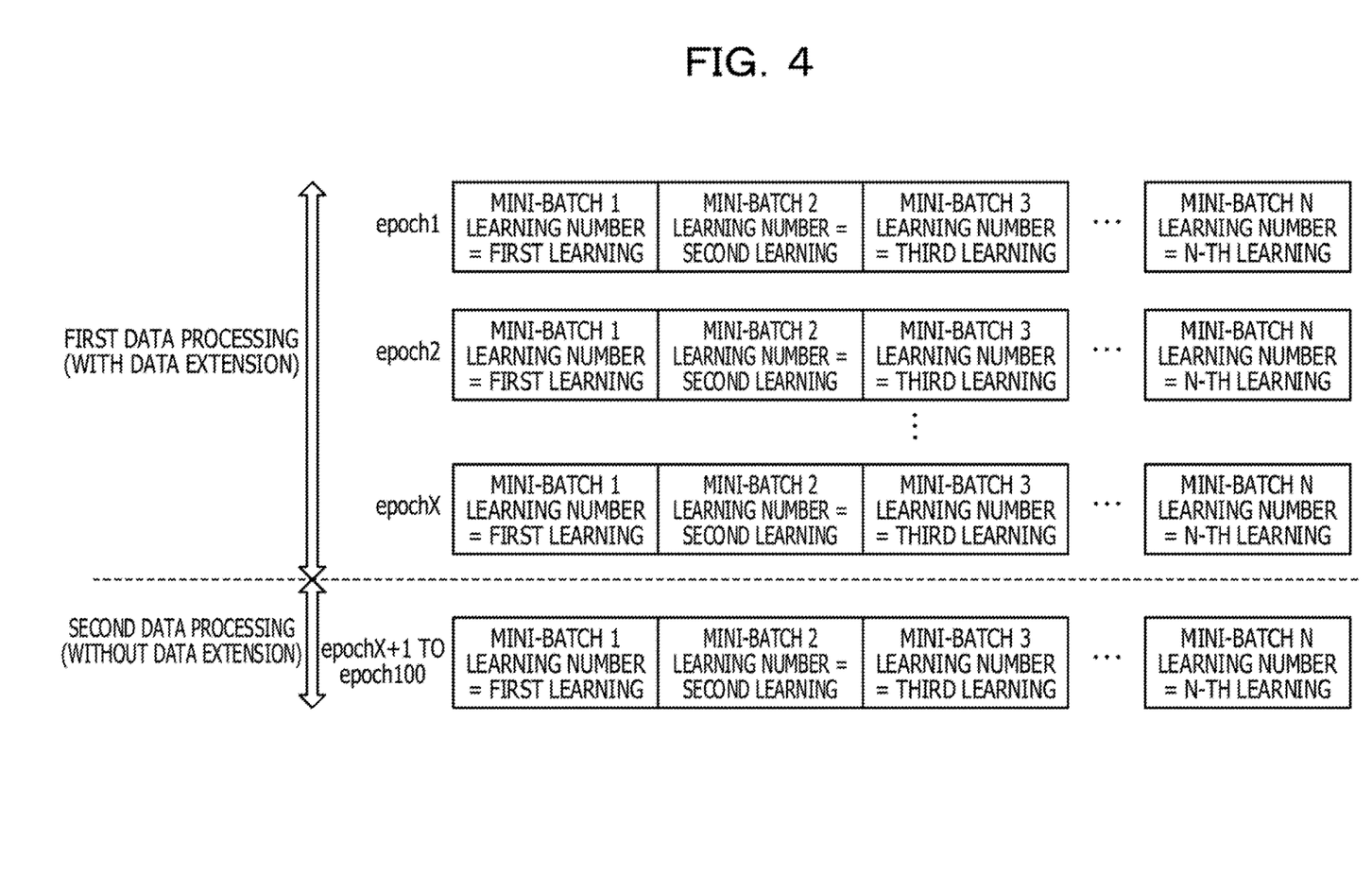
FIG. 4 illustrates a configuration example of mini-batches in learning processing.

FIG. 4 illustrates a configuration example of mini-batches in learning processing. As illustrated in FIG. 4, in the learning processing, the learning unit 120 performs the first learning using a first mini-batch ("mini-batch 1") of the first mini-batches generated in the first data processing. After that, the learning unit 120 performs learning N times up to the N-th first mini-batch ("mini-batch N"). Through these processes, the learning unit 120 completes learning for one epoch.

Here, assume that the learning processing in the present embodiment is composed of learning for 100 epochs. Of the learning in 100 epochs, the learning unit 120 performs learning using the first mini-batches generated in the first data processing up to the X-th epoch (for example, 90≤X≤99) (it is assumed that the first data processing is performed in each epoch to generate new first mini-batches for learning).

Then, the learning unit 120 performs learning in the X+1-th epoch to the 100th epoch using the second mini-batches generated in the second data processing.

<Functional Configuration of Learning Unit>

Figure 5:
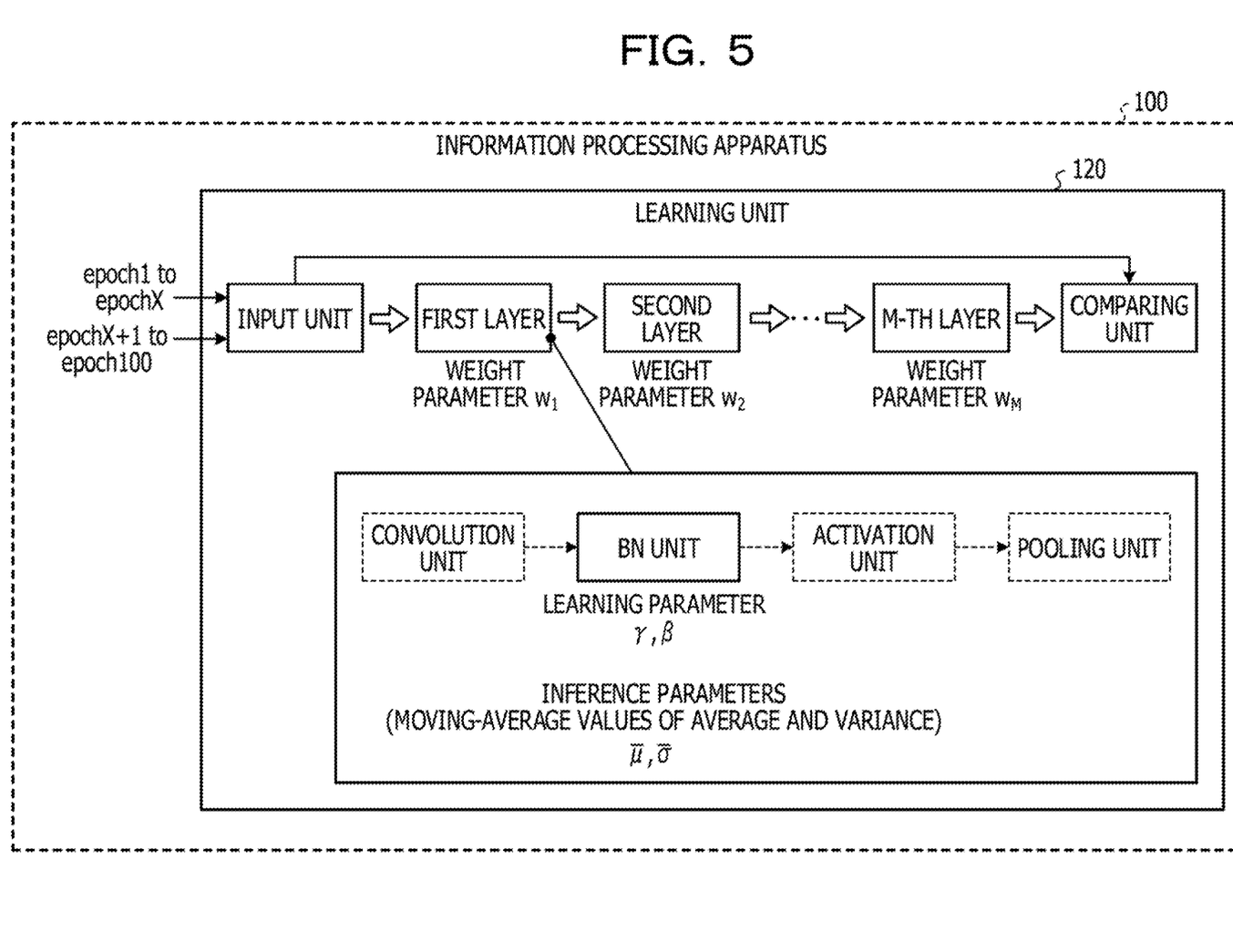
FIG. 5 is a first diagram illustrating an example of the functional configuration of a learning unit of the information processing apparatus.

Next, the functional configuration of the learning unit 120 of the information processing apparatus 100 is described. FIG. 5 is a first diagram illustrating an example of the functional configuration of the learning unit of the information processing apparatus. As illustrated in FIG. 5, the learning unit 120 includes an input unit, network layers (network layers of DNNs) of the first layer to the M-th layer, and a comparing unit. Each network layer from the first layer to the M-th layer includes, for example, a convolution unit, a batch normalization unit (BN unit), an activation unit, and a pooling unit (see the lower part in FIG. 5).

With the functional configuration illustrated in FIG. 5, the first mini-batches are inputted into the input unit in the first epoch to the X-th epoch in the learning unit 120. With this operation, the first to N-th mini-batches are sequentially inputted into the first layer, and the comparing unit is notified of the corresponding correct data.

Each network layer from the first layer to the M-th layer performs computation on the data outputted from the input unit (or the previous network layer), using weight parameters updated by the previous learning, and outputs the resultant into the next network layer. The data outputted from the M-th layer is outputted into the comparing unit as the recognition result.

The comparing unit compares the recognition result outputted from the M-th layer and the correct data provided from the input unit and calculates the difference values between the recognition result and the correct data. The difference values calculated by the comparing unit are propagated backward, and the weight parameters of each network layer from the first layer to the M-th layer are updated.

Of the units included in each network layer (see the lower part of FIG. 5), detailed description of the processing at the convolution unit, the activation unit, and the pooling unit is omitted, and here, the processing at the BN unit is described in detail.

The BN unit normalizes the inputted mini-batches using average μ and variance σ of the inputted mini-batches and then performs an affine conversion on the resultant (see the following equation where $x_i$ refers to the data included in each mini-batch).

$$\hat{x}_i \leftarrow \frac{x_i - \mu}{\sigma}$$

$$y_i \leftarrow \gamma \hat{x}_i + \beta$$

Learning parameters γ and β in the above equation are updated along with the backward propagation of the difference values when learning is performed using each mini-batch, in the same way as for the weight parameters. The BN unit calculates the inference parameters (moving-average values of μ and moving-average values of σ) based on the following equation.

$$\bar{\mu} \leftarrow \alpha\bar{\mu} + (1-\alpha)\mu$$

$$\bar{\sigma} \leftarrow \alpha\bar{\sigma} + (1-\alpha)\sigma$$

Then, with the functional configuration illustrated in FIG. 5, the learning unit 120 inputs the second mini-batches to the input unit from the X+1-th epoch to the 100th epoch. With this operation, the first to N-th mini-batches are sequentially inputted into the first layer, and the comparing unit is sequentially notified of the corresponding correct data.

Each network layer from the first layer to the M-th layer performs computation on the data outputted from the input unit (or the previous network layer), using weight parameters updated by the previous learning, and outputs the resultant into the next network layer. The data outputted from the M-th layer is inputted into the comparing unit as recognition result.

The comparing unit compares the recognition result outputted from the M-th layer and the correct data provided from the input unit and calculates the difference values between the recognition result and the correct data. The difference values calculated by the comparing unit are propagated backward, and the weight parameters of each network layer from the first layer to the M-th layer are updated.

When each learning is performed in the X+1-th epoch and after, the learning rate is usually low, and hence, the update amount when the weight parameters are updated is very small. On the other hand, the inference parameters calculated at the BN unit are greatly changed by mini-batches inputted just before the learning processing finishes (for example, the second mini-batches in the X+1-th epoch to the 100th epoch).

As above, the learning unit 120 performs learning using the first mini-batches and after that, performs learning using the second mini-batches.

This enables the learning unit 120 to calculate proper weight parameters having high generalization performance and proper inference parameters having less bias. Thus, the first embodiment is able to improve the performance (inference accuracy) of the learning result (trained model) as compared to the case where learning is performed using only the first mini-batches in the learning processing.

<Procedure of Learning Processing>

Figure 6:
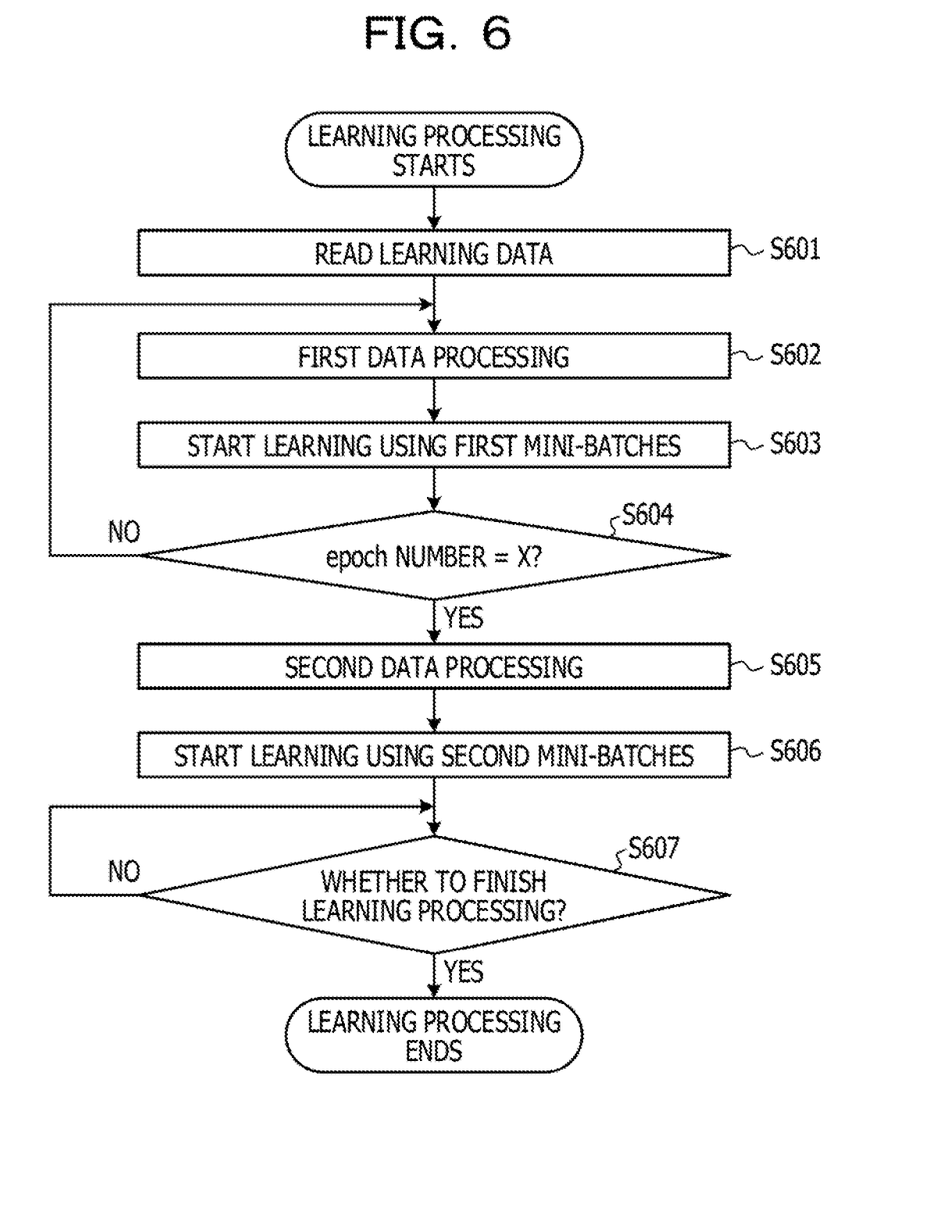
FIG. 6 is a first flowchart illustrating the procedure of learning processing performed by the information processing apparatus.

Next, the procedure of learning processing performed by the information processing apparatus 100 is described. FIG. 6 is a first flowchart illustrating the procedure of learning processing performed by the information processing apparatus. As illustrated in FIG. 6, the extension unit 110 reads learning data from the learning-data storage unit 140 at step S601.

At step S602, the extension unit 110 performs the data extension processing on the read learning data to generate the first mini-batches. At step S603, the learning unit 120 starts learning using the first mini-batches.

At step S604, the learning unit 120 determines whether the learning in the X-th epoch has been completed. In the case where it is determined at step S604 that the learning in the X-th epoch has not been completed (in the case of No at step S604), the learning unit 120 performs the data extension processing at step S602 again and continues learning using the first mini-batches. On the other hand, in the case where it is determined at step S604 that the learning in the X-th epoch has been completed (Yes at step S604), the processing proceeds to step S605.

At step S605, the extension unit 110 generates the second mini-batches without performing the data extension processing on the read learning data. At step S606, the learning unit 120 starts learning using the second mini-batches.

At step S607, the learning unit 120 determines whether to finish the learning processing. In the case where the learning unit 120 determines at step S607 not to finish the learning processing (No at step S607), the learning unit 120 continues learning using the second mini-batches. In the case where the learning unit 120 determines at step S607 to stop the learning processing (Yes at step S607), the learning processing ends.

As is apparent from the above description, in the information processing apparatus 100 according to the first embodiment, the extension unit 110 executes processing to perform the data extension processing on the learning data to generate the first mini-batches and processing to generate the second mini-batches without performing the data extension processing. In the learning processing, the learning unit performs learning using the first mini-batches, and after that, the learning unit performs learning using the second mini-batches.

This enables the information processing apparatus 100 according to the first embodiment to calculate proper weight parameters having high generalization performance and proper inference parameters having less bias. Thus, the information processing apparatus 100 according to the first embodiment improves the performance of the learning result.

Second Embodiment

The above first embodiment has been described on the assumption that when learning is performed using the second mini-batches, the weight parameters are updated in addition to the learning parameter. For a second embodiment, when learning is performed using the second mini-batches, the learning rate is set to zero to fix the weight parameters and update only the learning parameters. Hereinafter, the second embodiment is described mainly in terms of differences from the aforementioned first embodiment <Functional Configuration of Learning Unit>

Figure 7:
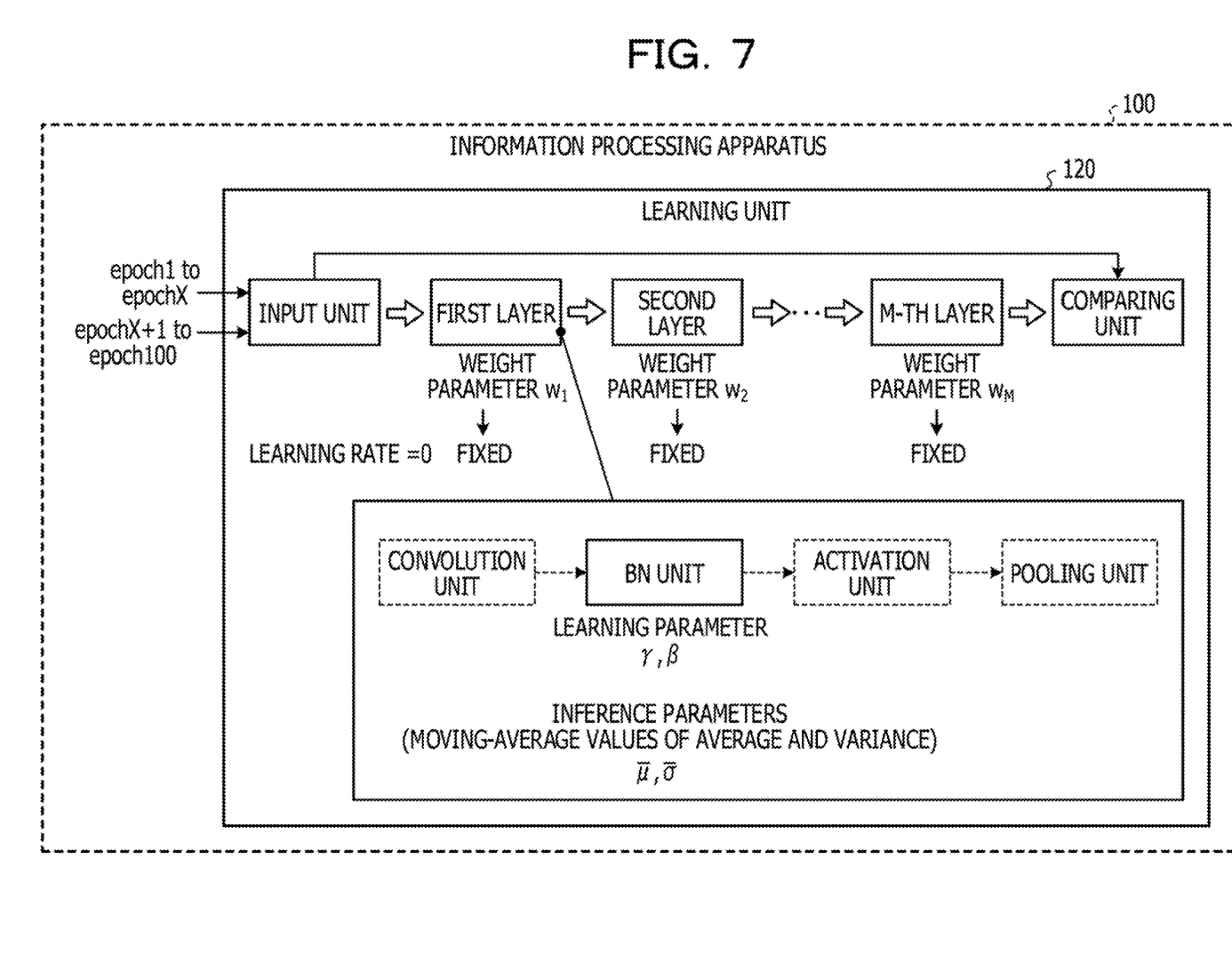
FIG. 7 is a second diagram illustrating an example of the functional configuration of a learning unit of an information processing apparatus.

First, description is made of the functional configuration of a learning unit 120 of an information processing apparatus 100 according to the second embodiment. FIG. 7 is a second diagram illustrating an example of the functional configuration of the learning unit of the information processing apparatus. The difference from FIG. 5 is that the learning rate is set to zero when learning is performed using the second mini-batches in the X+1-th epoch to the 100th epoch.

With this operation, even in the case where the difference values between the recognition result outputted from the M-th layer and the correct data provided from the input unit is backward propagated, the update amount of the weight parameters of each network layer from the first layer to the M-th layer is zero and fixed.

On the other hand, the learning parameters updated in the BN unit are greatly changed, regardless of the setting of the learning rate, by mini-batches inputted just before the learning processing finishes (for example, the second mini-batches in the X+1-th epoch to 100th epoch).

As described above, the learning unit 120 continues learning, keeping the proper weight parameters having high generalization performance and calculated by learning using the first mini-batches. The learning unit 120 calculates proper inference parameters having less bias by learning using the second mini-batches.

This allows the second embodiment to dispense with the process for backward propagation as compared to the above first embodiment because the weight parameters do not have to be updated. Thus, the second embodiment improves the learning speed.

<Procedure of Learning Processing>

Figure 8:
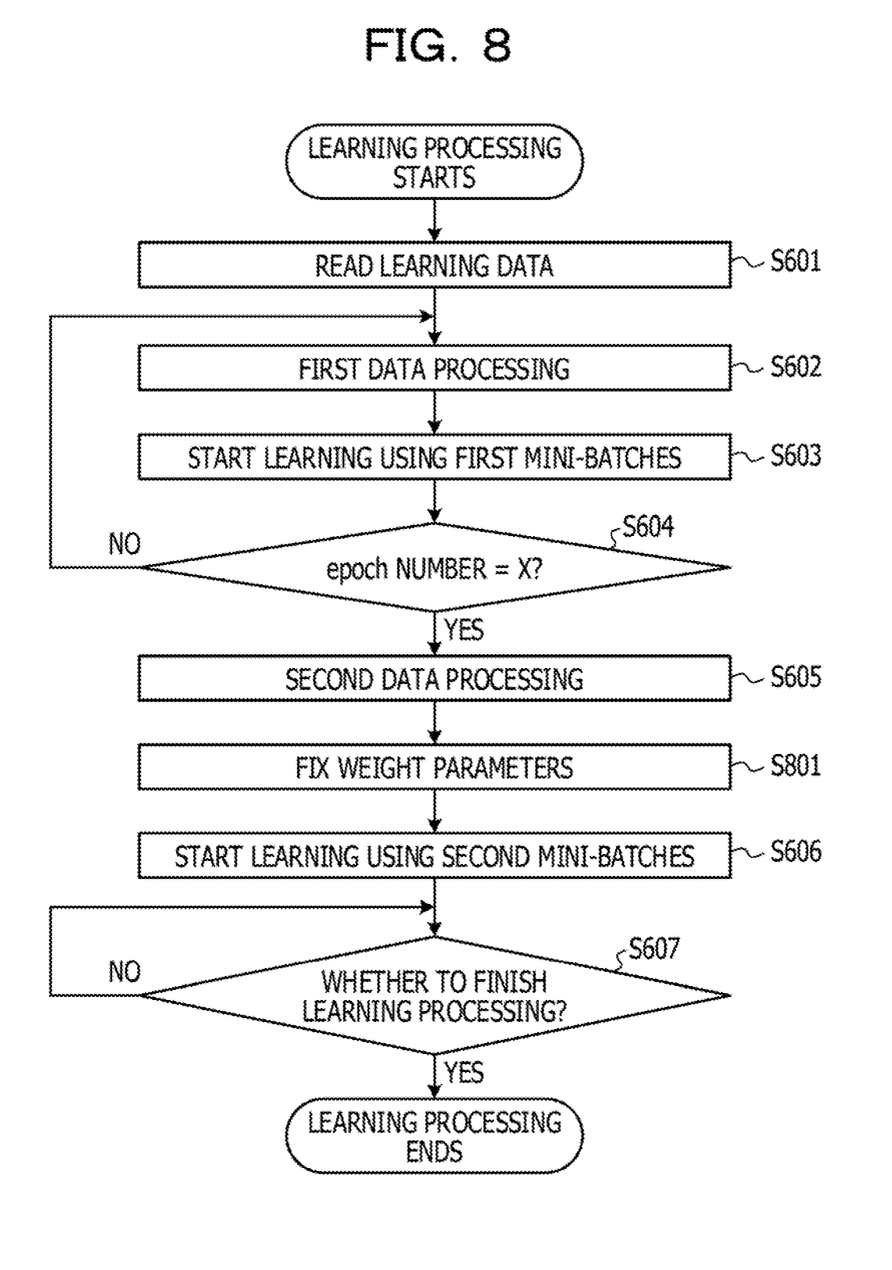
FIG. 8 is a second flowchart illustrating the procedure of the learning processing performed by the information processing apparatus.

Next, the procedure of learning processing performed by the information processing apparatus 100 according to the second embodiment is described. FIG. 8 is a second flowchart illustrating the procedure of learning processing performed by the information processing apparatus. The difference from the learning processing illustrated in FIG. 6 resides at step S801.

At step S801, the learning unit 120 sets the learning rate to zero to fix the weight parameters used for learning using the second mini-batches.

As is apparent from the above description, in the information processing apparatus 100 according to the second embodiment, the extension unit 110 executes processing to perform the data extension processing on the learning data to generate the first mini-batches and processing to generate the second mini-batches without performing the data extension processing. The learning unit performs learning using the first mini-batches, and after that, the learning unit performs learning using the second mini-batches with the weight parameters fixed.

This enables the information processing apparatus 100 according to the second embodiment to calculate proper weight parameters having high generalization performance and proper inference parameters having less bias. Thus, the information processing apparatus 100 according to the second embodiment increases the learning speed, in addition to the effects provided in the above first embodiment.

Third Embodiment

The above first and second embodiments have been described on the assumption that in the learning processing, learning in the X+1-th epoch to the 100th epoch is performed using the second mini-batches to calculate proper inference parameters having less bias.

In the third embodiment, further, inference data is used in inference processing to update the inference parameters. This operation allows the third embodiment to keep performance (inference accuracy) of the learning result even if the learning data and the inference data are much different.

Hereinafter, the third embodiment is described mainly in terms of differences from the aforementioned first and second embodiments.

<Functional Configuration of Information Processing Apparatus>

Figure 9:
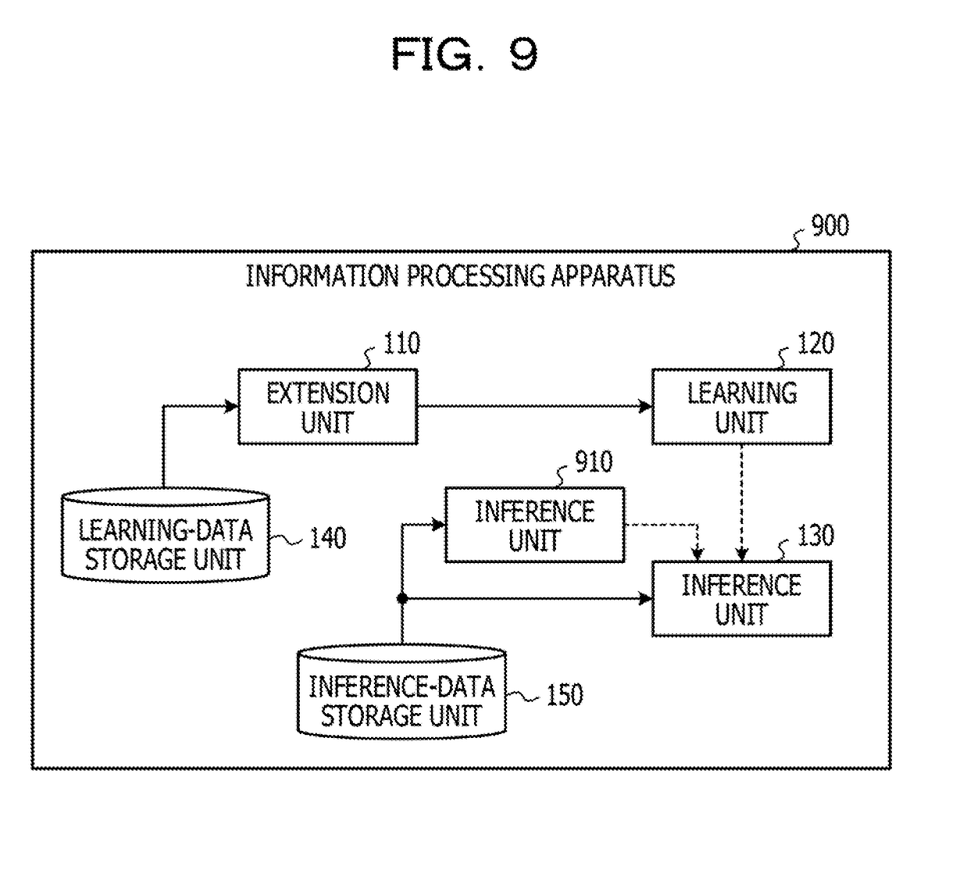
FIG. 9 is a second diagram illustrating an example of the functional configuration of an information processing apparatus.

First, description is made of the functional configuration of an information processing apparatus 100 according to the third embodiment. FIG. 9 is a second diagram illustrating an example of the functional configuration of the information processing apparatus. The difference from the information processing apparatus 100 described with reference to FIG. 1 is that an information processing apparatus 900 illustrated in FIG. 9 has an update unit 910.

Figure 10:
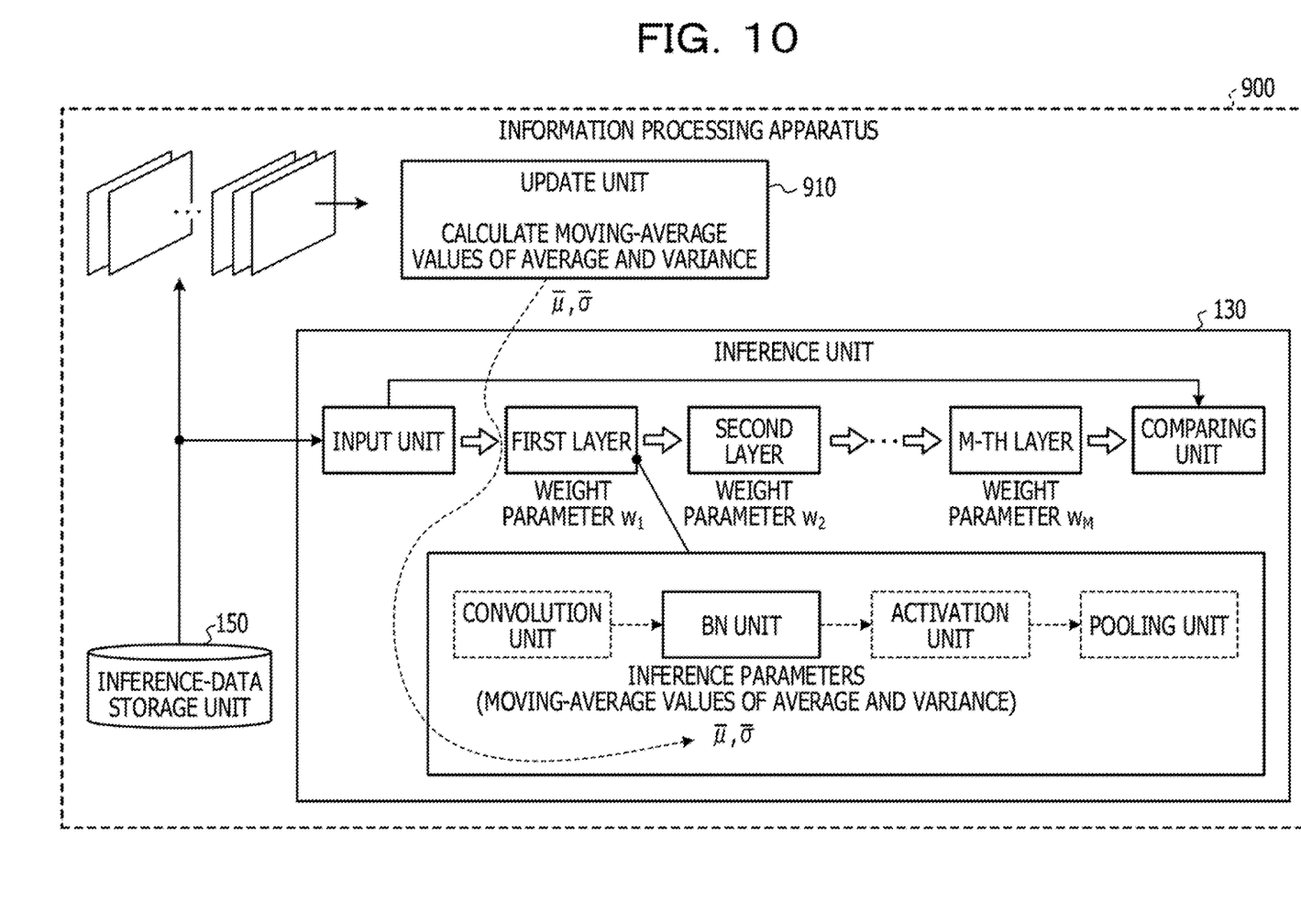
FIG. 10 illustrates an example of the functional configuration of an update unit and inference unit of the information processing apparatus.

The update unit 910, for example, includes a mechanism similar to the one in the learning unit 120 that completes learning processing and sets the learning rate to zero. With this configuration, the update unit 910 calculates inference parameters (moving-average values of ρ and moving-average values of σ) after reading a specified number of inference data pieces stored in the inference-data storage unit 150. The update unit 910 sets the calculated inference parameters into the BN unit of each layer included in the inference unit 130 (the example in FIG. 10 illustrates the calculated inference parameters set into the BN unit of the first layer). This allows the inference unit 130 to receive input inference data in the state where the inference parameters calculated based on the inference data is set into the BN unit of each layer, and to output the inference result.

<Functional Configuration of Update Unit and Inference Unit>

Next, description is made of the functional configurations of the update unit 910 and the inference unit 130 of the information processing apparatus 900 according to the third embodiment. FIG. 10 illustrates an example of the functional configuration of the update unit and the inference unit of the information processing apparatus.

As illustrated in FIG. 10, the update unit 910 reads a specified number of inference data pieces from the inference-data storage unit 150 and calculates inference parameters (moving-average values of ρ and moving-average values of σ). The update unit 910 sets the calculated inference parameters into the BN unit of each layer included in the inference unit 130.

<Procedure of Inference Processing>

Figure 11:
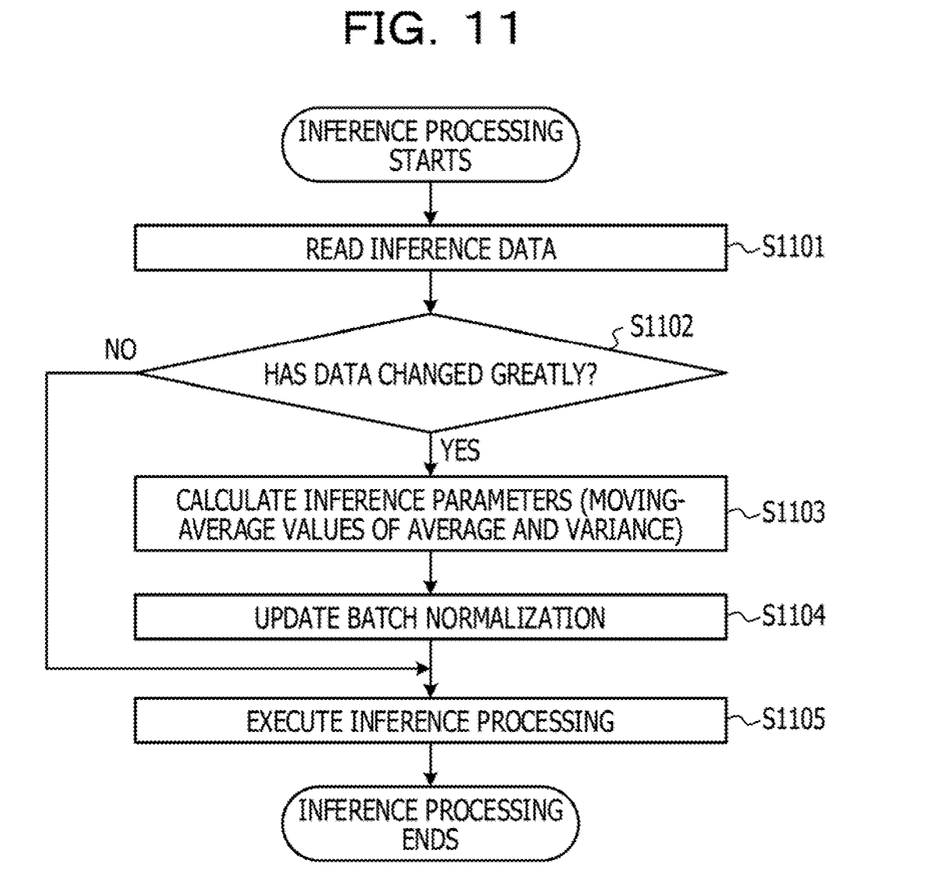
FIG. 11 is a flowchart illustrating the procedure of inference processing performed by the information processing apparatus.

Next, the procedure of inference processing performed by the information processing apparatus 900 according to the third embodiment is described. FIG. 11 is a flowchart illustrating the procedure of the inference processing performed by the information processing apparatus.

At step S1101, the update unit 910 reads a specified number of inference data pieces from the inference-data storage unit 150.

At step S1102, the update unit 910 analyzes the read inference data pieces of the specified number and compares the read inference data pieces to the learning data to determine whether the data has been greatly changed. In the case where it is determined at step S1102 that the data has not been greatly changed (in the case of No at step S1102), the process proceeds to step S1105.

On the other hand, in the case where it is determined at step S1102 that the data has been changed greatly (in the case of Yes at step S1102), the process proceeds to step S1103.

At step S1103, the update unit 910 calculates inference parameters based on the read inference data pieces of the specified number.

At step S1104, the update unit 910 sets the calculated inference parameters into the BN unit of each layer included in the inference unit 130.

At step S1105, the inference unit 130 performs the inference processing, using the read inference data. The inference unit 130 outputs the inference result, and the inference processing ends.

As is apparent from the above description, in the information processing apparatus 900 according to the third embodiment, the update unit 910, in inference processing, calculates the inference parameters using the inference data and sets the inference parameters into the BN units.

This enables the information processing apparatus 900 according to the third embodiment to perform inference processing using proper weight parameters having high generalization performance and proper inference parameters conforming to the inference data. Thus, the information processing apparatus 900 according to the third embodiment improves the performance of learning result (inference accuracy).

Other Embodiments

Although in the above first and second embodiments, the process details of the data extension processing are illustrated as an example in FIG. 3, the process details of the data extension processing are not limited to this example but may be other processing as long as the processing transforms learning data randomly.

For example, the data extension processing may be performed such that the variance a of the first mini-batches generated in the first data processing is larger than the variance a of the second mini-batches generated in the second data processing.

In the above first and second embodiments, the description has been made for the case where the information processing apparatus 100 has a single GPU 202, for convenience of explanation. However, the information processing apparatus 100 may have multiple GPUs. In this case, for example, when the BN unit implemented in each GPU calculates inference parameters (moving-average values of ρ and moving-average values of σ), the average value of inference parameters calculated by the BN unit implemented in each GPU may be set into each BN unit.

In the above first and second embodiments, the description has been made on the assumption that in the case where it is determined that learning in the X-th epoch has been completed, learning using the first mini-batches is switched to learning using the second mini-batches. However, the timing at which learning using the first mini-batches is switched to learning using the second mini-batches is not limited to this timing. Learning using the first mini-batches may be switched to learning using the second mini-batches, for example, when the learning rate reaches a specified value.

Although in the above first and second embodiments, learning for 100 epochs is performed, the epoch number is not limited to 100.

In the above second embodiment, the description has been made on the assumption that in the case where it is determines that the data has been greatly changed, the inference parameters are calculated based on the inference data. However, the basis of determination of whether to calculate the inference parameters based on the inference data is not limited to this example. The inference parameters may be calculated based on inference data in the case where average p and variance a calculated based on the inference data have changed by a specified threshold or more.

The above embodiments have been described on the assumption that the extension unit, the learning unit, the update unit, and the inference unit are implemented in a single information processing apparatus 100 (or 900). However, these units may be implemented in multiple information processing apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory circuit; and
   a processor circuit coupled to the memory circuit, the processor circuit being configured to:
   convert learning data stored in the memory circuit into a first mini-batch by automatically performing data extension processing on the learning data, the data extension processing including automatically extracting a first portion area at randomly determined position and range from a whole of the learning data and automatically resizing the extracted first portion area to a predetermined size;
   perform first learning processing on a weight parameter of each layer in a neural network by using the first mini-batch;
   determine whether a predetermined condition is satisfied in the performing of the first learning processing;
   in a case where the predetermined condition is satisfied in the performing of the first learning processing, automatically convert the learning data into a second mini-batch without performing the data extension processing on the learning data, the converting of the learning data without performing the data extension processing including automatically resizing whole of the learning data into the predetermined size and automatically extracting a second portion area at predetermined position and range from among whole of the resized learning data, and
   automatically perform, using the second mini-batch, second learning processing on the weight parameter of each layer in the neural network on which the first learning processing has been performed using the first mini-batch;
   input inference data stored in the memory circuit into the neural network on which the second learning processing has been performed using the second mini-batch; and
   output an inference result obtained by the inputting of the inference data to the neural network.

2. The information processing apparatus according to claim 1, wherein the processor circuit being configured to perform the second learning processing when the first learning processing reaches an epoch number determined in advance.

3. The information processing apparatus according to claim 1, wherein the processor circuit being configured to perform the second learning processing when the first learning processing reaches a learning rate determined in advance.

4. The information processing apparatus according to claim 1, wherein the processor circuit being configured to perform the first learning processing, and then perform the second learning processing in a state where a weight parameter of each network layer included in the second learning processing is fixed.

5. The information processing apparatus according to claim 1, wherein the processor circuit is further configured to:
   execute an inference processing that includes performing inference processing by inputting inference data into learning result obtained in the second learning processing; and
   execute an update processing when the inference data is inputted, the update processing being configured to calculate an inference parameter by using the inference data, and set the inference parameter into the inference processing.

6. A non-transitory computer-readable storage medium for storing a program which causes a processor of a computer to perform processing, the processing comprising:
   converting learning data stored in a memory circuit of the computer into a first mini-batch by automatically performing data extension processing on the learning data, the data extension processing including automatically extracting a first portion area at randomly determined position and range from a whole of the learning data and automatically resizing the extracted first portion area to a predetermined size; and
   performing first learning processing on a weight parameter of each layer in a neural network by using the first mini-batch;
   determining whether a predetermined condition is satisfied in the performing of the first learning processing;
   in a case where the predetermined condition is satisfied in the performing of the first learning processing, automatically converting the learning data into a second mini-batch without performing the data extension processing on the learning data, the converting of the learning data without performing the data extension processing including automatically resizing whole of the learning data into the predetermined size and automatically extracting a second portion area at predetermined position and range from among whole of the resized learning data, and
   automatically performing, using the second mini-batch, second learning processing on the weight parameter of each layer in the neural network on which the first learning processing has been performed using the first mini-batch;
   inputting inference data stored in the memory circuit into the trained neural network on which the second learning processing has been performed using the second mini-batch; and
   outputting an inference result obtained by the inputting of the inference data to the neural network.

7. An information processing method implemented by a computer, the method comprising:
- converting learning data stored in a memory circuit of the computer into a first mini-batch by automatically performing data extension processing on the learning data, the data extension processing including automatically extracting a first portion area at randomly determined position and range from a whole of the learning data and automatically resizing the extracted first portion area to a predetermined size; and
- performing first learning processing on a weight parameter of each layer in a neural network by using the first mini-batch;
- determining whether a predetermined condition is satisfied in the performing of the first learning processing;
- in a case where the predetermined condition is satisfied in the performing of the first learning processing,
- automatically converting the learning data into a second mini-batch without performing the data extension processing on the learning data, the converting of the learning data without performing the data extension processing including automatically resizing whole of the learning data into the predetermined size and automatically extracting a second portion area at predetermined position and range from among whole of the resized learning data, and
- automatically performing, using the second mini-batch, second learning processing on the weight parameter of each layer in the neural network on which the first learning processing has been performed using the first mini-batch;
- inputting inference data stored in the memory circuit into the trained neural network on which the second learning processing has been performed using the second mini-batch; and
- outputting an inference result obtained by the inputting of the inference data to the neural network.

* * * * *